Figure 1:
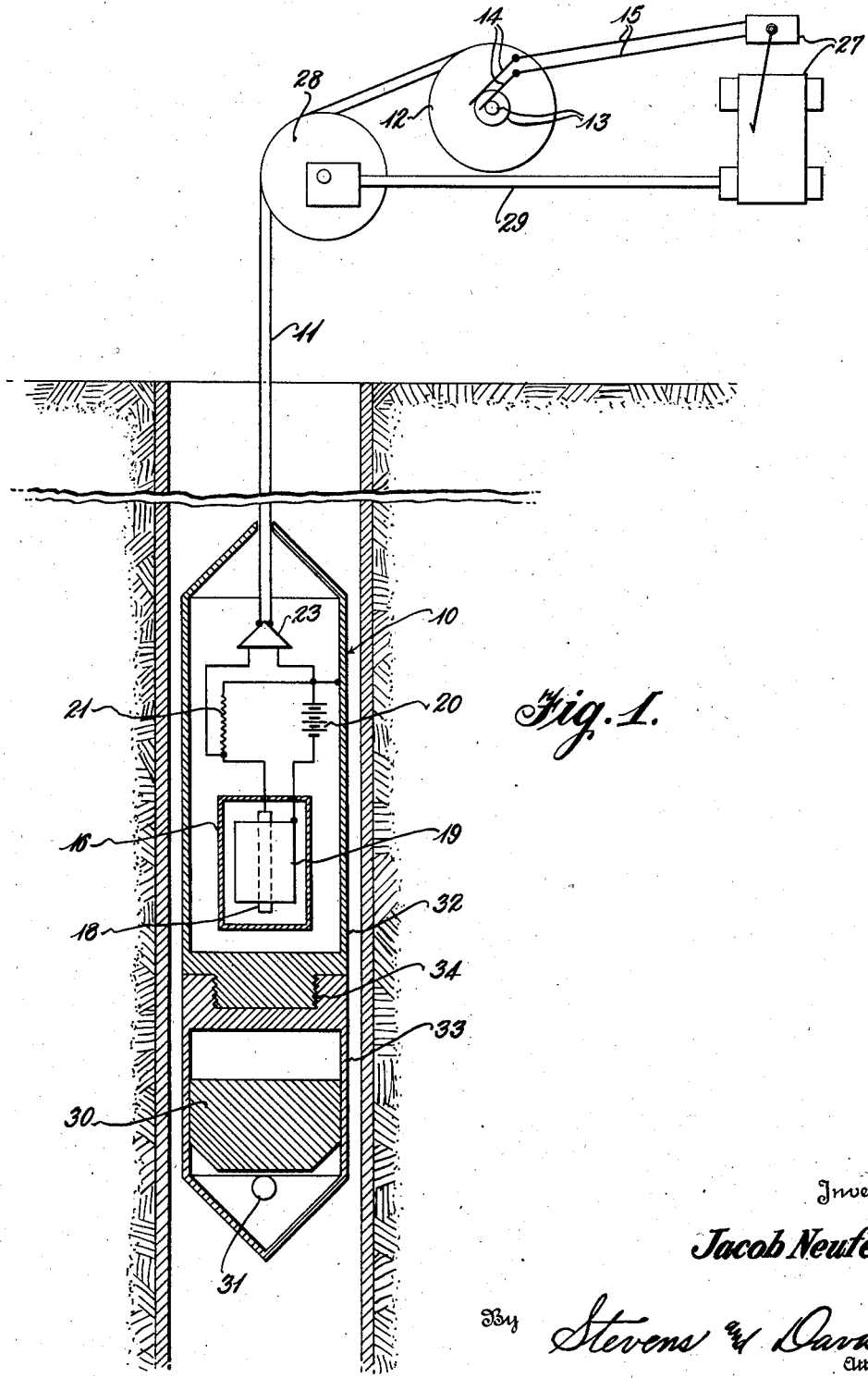

July 14, 1942.   J. NEUFELD   2,289,926
WELL SURVEY METHOD AND APPARATUS
Filed March 18, 1940   2 Sheets-Sheet 1

Inventor
Jacob Neufeld
By Stevens & Davis
Attorneys

July 14, 1942. J. NEUFELD 2,289,926
WELL SURVEY METHOD AND APPARATUS
Filed March 18, 1940 2 Sheets-Sheet 2

Inventor
Jacob Neufeld
By Stevens and Davis
Attorneys

Patented July 14, 1942

2,289,926

UNITED STATES PATENT OFFICE 2,289,926

WELL SURVEY METHOD AND APPARATUS

Jacob Neufeld, Tulsa, Okla., assignor to Well Surveys, Incorporated, Tulsa, Okla., a corporation of Delaware Application March 18, 1940, Serial No. 324,687

8 Claims. (Cl. 250—83.6)

This invention relates to geophysical prospecting and more particularly to subsurface geophysical prospecting in which the prospecting is accomplished by lowering an instrument into a drill hole or other opening in the ground rather than by bringing samples of the subsurface strata to the surface.

The instant method of geophysical prospecting is usable for surface prospecting and even for the examination of samples of earth taken by coring or other methods and some advantages may be realized by such uses of it, but the main purpose of this invention and the use that has been found most important is that of subsurface prospecting by lowering an instrument into a drill hole or other opening in the earth that extends down into the subsurface strata.

Prior to this invention a number of methods and devices have been suggested for determining the nature of subsurface strata without moving them from their position in the earth. Of these, several at least, relate to the lowering of certain instruments into drill holes or other openings in the ground there to make measurements which can be transmitted to the surface and correlated with the depths at which they are made so as to give a parameter indicative of the nature of the subsurface strata. One such method of subsurface prospecting that has actually been used consists in lowering into a drill hole or the like of a detector of the radioactivity emanating from the surrounding strata. Such a detector properly coupled through an amplifier can be used to send signals to the surface of the earth that will indicate the intensity of the natural radioactivity of the surrounding strata at various levels, even though the instrument itself is lowered into a cased drill hole and for that reason surrounded by a considerable thickness of steel wall.

Another development along this line contemplates the simultaneous lowering into the drill hole of a detector of radioactivity and a primary source of radioactivity with a shield between them so that the direct emanations from said source cannot affect the detector. The radiations then pass outward through the steel wall of the drill hole, if the drill hole is cased, and into the surrounding strata where they either stimulate a sort of secondary radioactivity in the surrounding strata or are scattered and in part returned to be detected by the detector. In either case the detector is influenced by the effect of the surrounding strata on the radiations from the primary source lowered into the well and the effect these surrounding strata have on the radiations can be used as an indication of their characteristics.

The present invention is an improvement upon this latter process. It has now been discovered that the natural radioactivity of subsurface strata is of sufficient magnitude so that if an attempt is made to measure the effect of a primary source of radioactive radiations upon the radiations from the surrounding strata, the measurement made by the detector is not a true measure of the effect of the primary source of radiations upon the surrounding strata but it is a combined measurement of this effect and the natural radioactivity of the surrounding strata, the latter being of such considerable relative magnitude that the effect of the primary source of radiation is often lost or obscured. Prior to the present time, apparently, practical consideration of the situation or practical work thereon had not advanced to a point where it was appreciated that this would be the case. Apparently those who considered the problem at all believed that the artificially induced radioactivity would be of such magnitude that the natural radioactivity would not interfere in any way with its measurement.

Having found that the natural radioactivity does interfere with measurements of induced radioactivity or measurements of scattered radiations it has further been found that this effect can be eliminated by making two measurements one of natural radioactivity and the second of natural radioactivity plus induced radioactivity. A simple subtraction then gives a measurement of the induced radioactivity alone, in case the measurements are made only on an intensity basis.

Still further, however, it has been discovered that the use of a primary source of radioactivity and the irradiation of formations therewith will produce not only a change in the intensity of the radiations emanating from a formation but will also produce a change in the frequency distribution of the radiations from said formations. Following this discovery it has further been conceived that a measurement of the spectral distribution of the naturally emitted radiations may be made and that following this or prior to this a determination may be made of the spectral distribution of the radiations coming from the formations while they are being irradiated themselves from a primary source of radiation. By combining the two measurements an indication may be obtained of the change induced by the primary source of radiation and this is often very helpful in determining the nature of the various formations.

In order to obtain a more complete understanding of the general principles of this invention and also to better understand its details and its advantages reference may be had to the appended drawings and the following description of two embodiments shown therein.

Figure 2:
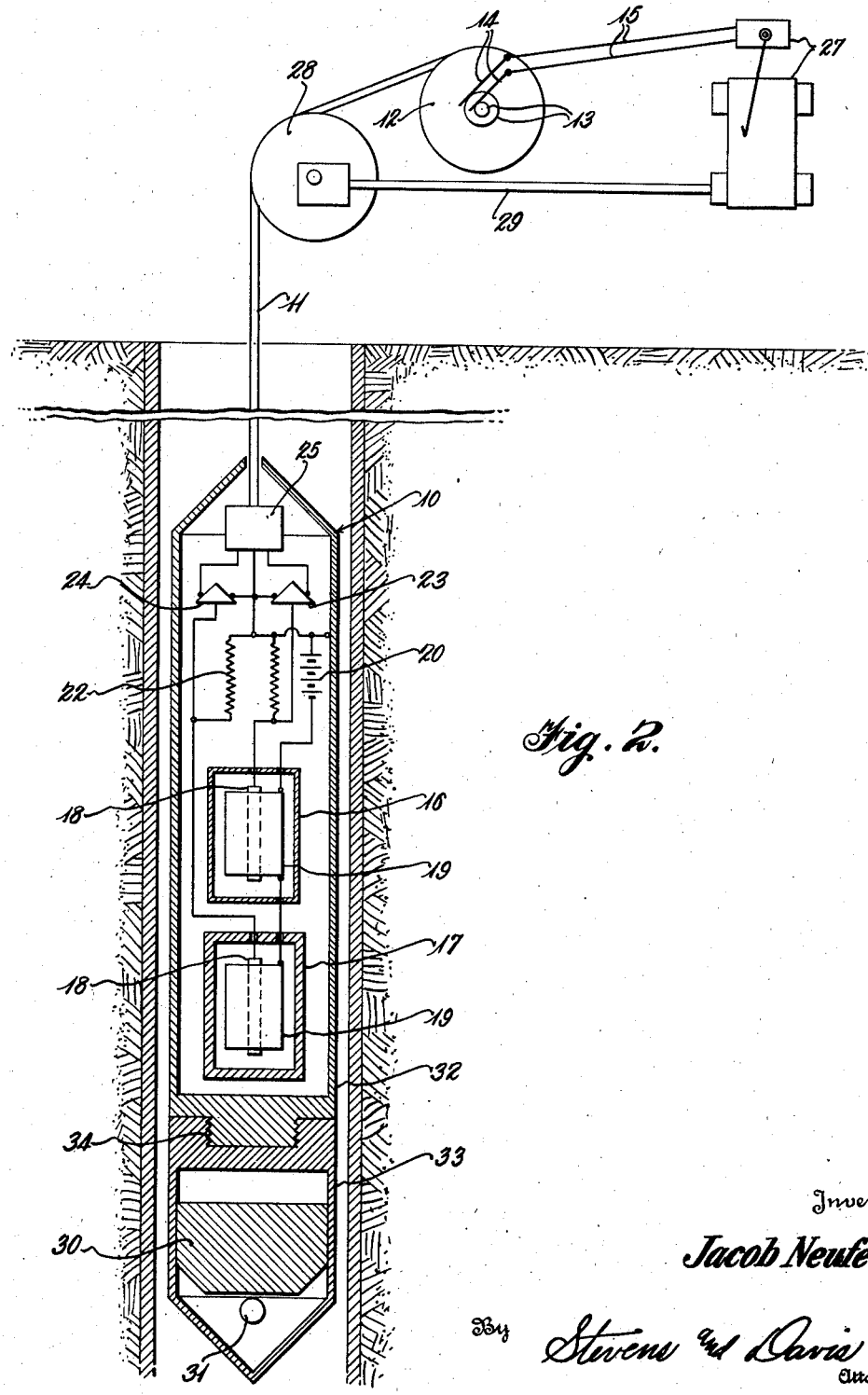

Figure 1 illustrates diagrammatically a device for measuring the intensity of the radiations, and Figure 2 illustrates, also diagrammatically, a device for measuring the spectral distribution of said radiations.

As shown in Figure 1 of the drawings an apparatus for the practice of the invention by the measurement of the change in intensity of the radiations due to the action of the primary source of radiations, may comprise a measuring instrument contained within a housing or capsule 10 supported on a cable 11 from a cable reel 12 on the surface of the earth.

Currents indicative of the measurements being taken by the measuring instrument are sent up through conductors in the cable 11 to the drum 12 from which they pass by means of slip rings 13 and brushes 14 into conductors 15 leading to a recording instrument 27.

Within the main casing 10 is contained an ionization chamber 16 preferably filled with an inert gas such as argon under a pressure of around 1500 to 2000 pounds per square inch and a pair of electrodes 18 and 19. The inner electrode 18 is preferably an iron rod about six inches in length and the outer electrode 19 is preferably a cylindrical iron sleeve about 2 inches in diameter and nearly as long as the rod.

Insulated connections to the electrodes pass through the chamber walls and a battery 20 and a resistance 21 are connected in series across the electrodes outside of the chamber. The battery 20 preferably has a voltage of around 150 volts and the resistor is preferably of around $10^{12}$ ohms resistance. The positive terminal of the battery may be connected to the main housing or casing 10.

Across the resistor 21 is connected an amplifier 23 which produces a current proportional to the potential drop across the resistor which in turn is proportional to the internal resistance of the ionization chamber and hence to the intensity of the radiations impinging upon it. This current is brought to the surface through the cable 11.

Below the ionization chamber 16 is positioned a heavy lead block 30 and below that a source of radioactivity 31. The source of radioactivity may be of any desired nature but preferably is a mixture of radon and beryllium, radon and beron, mesothorium and beryllium or radiothorium and boron. It is contemplated, however, that other sources of radiations may be substituted therefor, for example an X-ray tube if and when the X-ray tubes can be made to generate radiations having sufficient penetration. The lead block 30 serves as a shield to prevent the radiations from the source from passing directly to the ionization chamber 16.

The casing 10 is preferably made in two separable parts 32 and 33 joined by threading one into the other as shown at 34. Each part is separately sealed against the entrance of mud, water, oil or other foreign material. By so arranging the casing 10 the lower part containing the primary source of radiations may be removed so that the measuring instrument may be lowered into the well once without the primary source of radiations and again with the primary source of radiations.

In making any particular set of measurements it will generally be desirable to measure first without the primary source of radiations and thereafter with the primary source of radiations so that there will be no residual effect of the primary source acting upon the formation. However this procedure may be reversed and in some cases it may be desirable to measure the radioactivity both before and after the formations have been exposed to the primary source of radiations in order to detect specifically any residual effect of the radiations.

A record is made of the measurements made by the measuring instrument after they have passed the cable 11, the drum 12, the commutator rings 13, the brushes 14 and the conductors 15 by a recording meter 27 which records the amount of current conveyed to it on a sheet of paper or other material driven in accordance with the movements of the measuring instrument up and down in the well. This driving is accomplished by carrying the cable 11 over a wheel 28 at the top of the well and driving the paper on the recorder in accordance with the rotation of this wheel by a mechanical or electrical transmission system 29. In actual practice it is preferred to use an electrical transmission system for this purpose such as the well known "Selsyn" transmission system.

When it is desired to measure spectral or frequency distribution of the returning radiations rather than intensities this may be accomplished by the use of a device of the type shown in Figure 2. The surface parts of this device are similar to those shown in Figure 1 and the measuring instrument itself is quite similar except that it contains a second ionization chamber 17 which is more heavily shielded than the ionization chamber 16.

Because radiations of higher frequency have a greater penetrating power than those of lower frequency, the ionization chamber 17 will be affected to a greater degree by the radiations of higher frequency and to a less degree by those of lower frequency whereas those of both high and low frequency will affect the relatively unshielded ionization chamber 16.

The ionization chamber 17 contains an inner electrode 18 and an outer electrode 19 similar to those in ionization chamber 16. The outer electrode is connected to the negative of battery 20 and the inner electrode is connected through a resistor 22 to the positive terminal of the same battery. An amplifier 24 has its input connected across the resistor 22 so that it produces a current proportional to the potential drop across resistor 22 and hence proportional to the radiations affecting the ionization chamber 17.

The currents from the two amplifiers, one for the amplifier 23 which is operated from the potential drop across the resistor for the unshielded ionization chamber and the other which has just been mentioned, are conveyed to an electrical dividing circuit 25 which divides one current into the other and gives a quotient indicative of the balance between two ionization chambers or the average of the spectral or frequency distribution of the radiations impinging upon the two chambers. The current from this dividing circuit is carried to the surface in the same manner as was the current indicative of intensity alone in the device shown in Figure 1 and is similarly recorded.

With either of the devices illustrated two or more records may be made on the same record sheet, either consecutively or alongside of each other and the quantities indicated may be mathematically combined either by subtraction, addition or in some other manner to give the required indication. In the case of measurement of intensity it is usually simplest merely to subtract one indication from the other and obtain directly an indication of the effect caused by the primary source of radiation.

It may also be desirable to make a log of the natural radioactivity prior to exposure to the source of primary radiations and then make a second log of natural radioactivity subsequent to that time and compare these two logs. For this purpose it may at times be desirable to have a second ionization chamber and the necessary recording equipment linked to but spaced a fixed distance from the ionization chamber that is lowered with the source of radioactivity.

Such an ionization chamber is preferably placed below the source of radioactivity so that as the whole device is lowered into the well a log can be made by the lower ionization chamber of the natural radioactivity of the formation and a second log may be made by the ionization chamber accompanying the primary source of radiations, which log will be of induced radioactivity plus the natural radioactivity of the formation. Then, as the device is raised from the well the lower ionization chamber can make a record of any residual effect of the primary source of radiations at a rather definite time after the formation has been exposed. The same thing can be accomplished in a similar way with the device for measuring frequency distribution.

A large number of modifications of the particular devices and particular methods set forth may be made within the scope of this invention. For example, communication between the surface and the measuring instrument may be made in the manner described in application Serial No. 279,577, filed June 16, 1939, by Serge A. Scherbatskoy; application Serial No. 299,767, filed October 16, 1939, by Serge A. Scherbatskoy; application Serial Number 311,217, filed December 27, 1939, by Robert E. Fearon; application Serial Number 311,218, filed December 27, 1939, by Robert E. Fearon; application Serial Number 311,219, filed December 27, 1939, by Robert E. Fearon; or application Serial No. 299,766, filed October 16, 1939, by Robert E. Fearon. Similarly, the device in Figure 2 may be modified and arranged in accordance with any of the teachings of this inventor's application Serial No. 323,239, filed March 9, 1940. These are but a few of the possible changes and modifications that will doubtless occur to those skilled in the art once the principles of the present invention are considered and appreciated and all similar changes of this nature are contemplated and included within the scope of this invention.

I claim:

1. A method of geophysical prospecting that comprises measuring the radioactive radiations naturally emitted from a formation about which information is desired, measuring the radioactive radiations from the same formation while irradiating said formation with radiations from an external source and combining said measurements to obtain an indication of the effect of said external source of radiations upon the radiations from said formation.

2. A method of geophysical prospecting that comprises measuring the intensity of the radioactive radiations naturally emitted from a formation about which information is desired, measuring the intensity of the radioactive radiations from the same formation while irradiating said formation with radiations from an external source and combining said measurements to obtain an indication of the effect of said external source of radiations upon the radiations from said formation.

3. A method of geophysical prospecting that comprises measuring the frequency distribution of radioactive radiations naturally emitted from a formation about which information is desired, measuring the frequency distribution of radioactive radiations from the same formation while irradiating said formation with radiations from an external source and combining said measurements to obtain an indication of the effect of said external source on the frequency distribution of the radiations from said formation.

4. A method of geophysical prospecting that comprises measuring the intensity of the radioactive radiations naturally emitted from a formation about which information is desired, measuring the intensity of the radioactive radiations from said formation while irradiating said formation with radiations from an external source and subtracting the measurement of the naturally emitted radiations from said second measurement to obtain an indication of the intensity of the radiations caused to be emitted by the said external source.

5. A method of geophysical prospecting that comprises measuring the radioactive radiations naturally emitted from a subsurface formation about which information is desired while the subsurface formation remains in situ, measuring the radioactive radiations from the same formation with the formation still in situ, while irradiating said formation with radiations from an external source, and combining said measurements to obtain an indication of the effect of said external source of radiations upon the radiations from said formation.

6. A method of subsurface geophysical prospecting that comprises measuring, in situ, the intensity of the radio-active radiations naturally emitted from a formation about which information is desired, measuring in situ the intensity of the radioactive radiations from the same formation while irradiating said formation with radiations from an external source and combining said measurements to obtain an indication of the effect of said external source of radiations upon the radiations from said formation.

7. A method of subsurface geophysical prospecting that comprises measuring at various depths in an opening in the earth the radioactive radiations naturally emitted from a formation about which information is desired, measuring at the same location the radioactive radiations from the same formation while irradiating said formation with radiations from an external source, determining the depth at which said measurements were taken, and correlating said determination and measurements to obtain an indication of the effect of said external source of radiations upon the radiations of said formation in correlation with an indication of the location of the formation.

8. A method of subsurface geophysical prospecting that comprises continuously measuring at a continuously changing depth in an opening in the earth the radioactive radiations naturally emitted from the surrounding formation about which information is desired, simultaneously determining the position at which the measurement is being made and recording the measurement and the determination of position in correlation, continuously measuring at a continuously varying depth in the same opening the radioactive radiations from said same formation while irradiating said formation with radiations from an external source, simultaneously determining the position at which said measurement is being made, recording said second measurement and second determination of position in correlation and combining said recordings of measurements and determinations of position to obtain an indication of the effect of said external source of radiations upon the radiations from said formation at various depths.

JACOB NEUFELD.